United States Patent [19]

Galia

[11] 4,314,366

[45] Feb. 2, 1982

[54] METHOD AND APPARATUS FOR SELECTING AND DISPENSING INDIVIDUAL RECORDING DISCS STORED IN COMPARTMENTS IN A JUKE-BOX

[76] Inventor: Karl Galia, Schlossstrasse 3, Ohningen, Fed. Rep. of Germany

[21] Appl. No.: 114,077

[22] Filed: Jan. 21, 1980

[51] Int. Cl.[3] .................. G11B 17/22

[52] U.S. Cl. .................. 369/35; 369/30

[58] Field of Search .................. 209/583; 340/162; 312/18, 15; 360/98, 91, 92; 353/25; 274/10 D, 9 RA; 250/557, 555; 369/30, 33, 27, 34, 32, 35, 37, 38, 39

[56] References Cited

U.S. PATENT DOCUMENTS 3,595,388 7/1971 Castaldi .................. 209/583 X 3,662,344 5/1972 Menke .................. 340/162

*Primary Examiner*—Harry N. Haroian

*Attorney, Agent, or Firm*—Colton & Stone, Inc.

[57] ABSTRACT

In the selection and dispensing of one of a plurality of recording discs stored in compartments in a juke-box, each of said discs bearing a different code, one of said discs is selected by depressing a key, whereupon the stored discs are scanned automatically and, on detection of the selected disc, a dispensing mechanism is actuated automatically.

6 Claims, 1 Drawing Figure

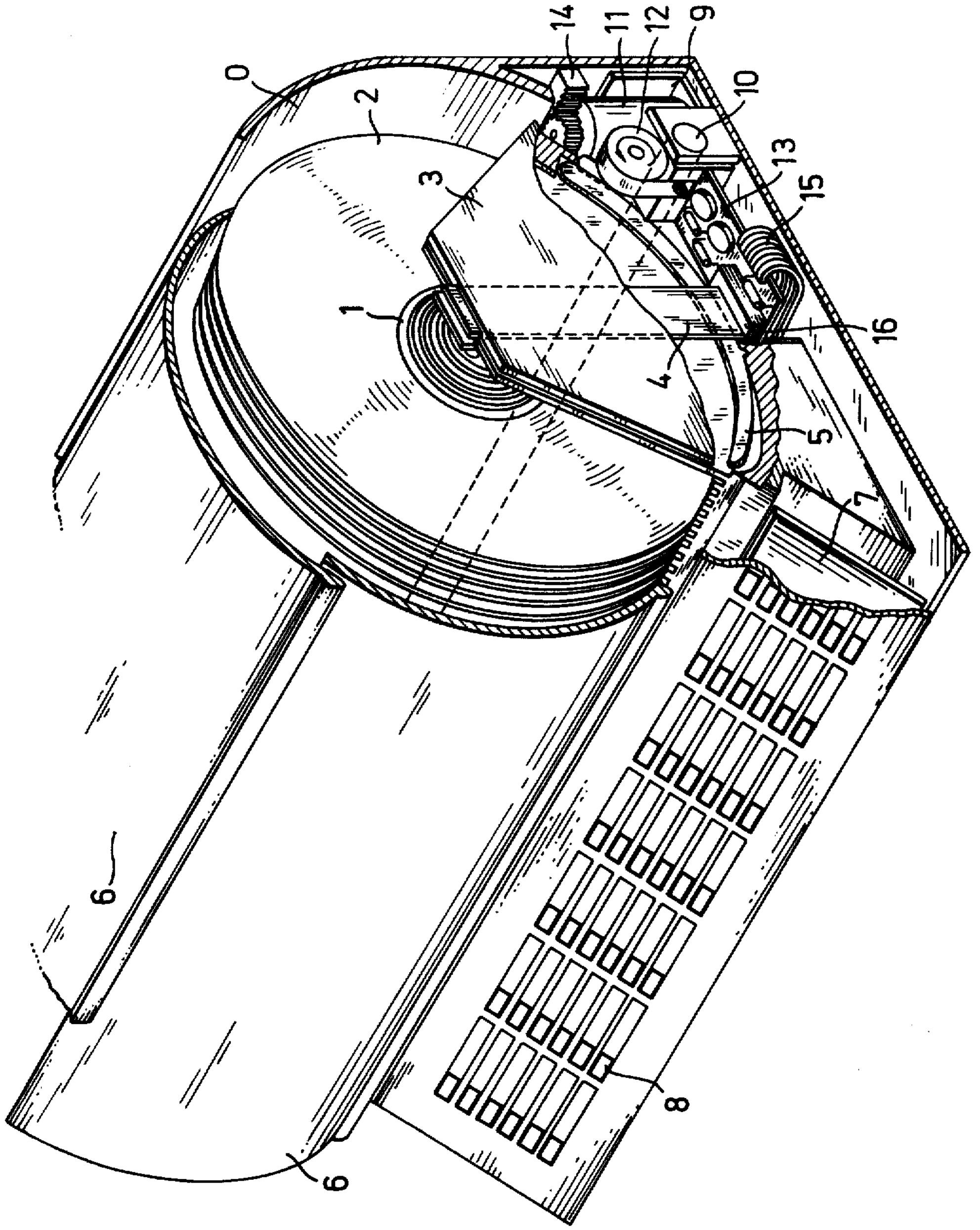
14
11
12
9
0
10
2
13
3
15
1
16
4
5
7
6
8
6

METHOD AND APPARATUS FOR SELECTING AND DISPENSING INDIVIDUAL RECORDING DISCS STORED IN COMPARTMENTS IN A JUKE-BOX

The invention relates to a method and apparatus for selecting and dispensing phonograph or disc records, hereinafter simply referred to as discs, stored in compartments in a juke-box.

Juke-boxes are machines that play selected discs in restaurants, bars, drugstores, dance halls etc. In one form of juke-box, the discs are stored in juxtaposition in compartments. Each compartment is associated with a particular key in a bank of such keys. When a key is depressed, a carriage is moved up to the selected compartment, withdraws the disc therefrom and places it on a turntable. To maintain this special association between a key and a particular disc, it is essential that the disc be stored only in its predetermined allocated compartment. This requirement for placing a disc in a special compartment can become very cumbersome. When inserting discs of the latest hit tunes and when replacing discs of less popular pop music with discs which are requested more frequently, one must follow a very special system. If this system is not observed, a disc other than the selected disc will be played on the turntable.

With this consideration in mind, it is an object of the present invention to devise a method which permits the haphazard insertion and replacement of discs without following a particular system or sequence and nevertheless obtain a proper relationship or association between each selecting key and a particular disc. The invention provides for each disc to be coded, the coding of all the discs is scanned successively and, when the selected disc has been detected, a dispensing mechanism is actuated, the disc is dispensed and then placed on the turntable. The invention thus departs from the teaching of the prior art in which the compartments are associated with the selecting keys. Instead, each disc is individually coded. The association is therefore no longer by way of the compartment but directly between a key and a disc.

The coding can be optical, magnetic, inductive, mechanical or by any other suitable means. Desirably, each disc is coded by adhering thereto a sticker or label which is divided into light-dark zones according to the binary-coded-decimal (BCD) code. A scanning and dispensing unit controllable by the bank of keys can be moved past the compartmented discs, stop when it detects the selected disc and operate the dispensing mechanism.

An apparatus for performing the method of the invention comprises juxtaposed storage compartments for the individual discs, a guide extending along the compartments for guiding a scanning and dispensing unit, a drive for said unit and a bank of keys for controlling said unit. Each compartment is associated with a code reader which is directed towards the coding on the associated disc, all the code readers being led to decoding and control means. The latter activate the drive when a key is depressed and stop the drive and activate the dispensing unit when the coding on a disc detected by the associated code reader is identical with the coding input from the depressed key.

Further features of the invention will become apparent from the following description and in particular from the recital of the claims.

In the accompanying drawing, the single FIGURE is a fragmentary diagrammatic pictorial view of one embodiment of apparatus according to the invention.

Referring to the drawing, a housing O comprises a plurality of compartments 3 defined by sector-shaped plates. Discs 2 are stored in the compartments by standing on edge, there being one compartment for each disc. A sticker or label 1 in accordance with the invention is ahdered to the central area of each disc where there is usually a title sheet containing particulars of the recording. Each compartment is associated with a light conductor 4. All the light conductors are stationary and extend vertically. The light input end of each conductor 4 is disposed opposite the sticker 1 of the disc in the same compartment. The lower or light output ends of the conductors 4 are disposed above photocells 16 for a purpose hereinafter described. Each compartment 3 or each disc 2 is associated with a dispensing lever 5. In this connection, there are two possible constructions; there may be one dispensing lever for each compartment or a single dispensing lever common to all the compartments and moved along beneath the compartments together with the scanning and control unit. The housing O is closed by two covers 6. Each cover extends through an arc of about 90° and is of transparent plastics material. The two covers 6 can be displaced to a position below the compartments and discs so as to render the discs freely accessible. At the front of the housing there is a bank 7 of keys 8. A carriage 9 is displaceable beneath the compartments; it is guided on a rod 10 and driven by a stepping motor 11. By means of a pinion, it moves along a rack 14. A rotary magnet 12 is also mounted on the carriage 9. Further, the carriage 9 supports electric or electronic circuitry 13. The latter is connected to the bank 7 of keys 8 and to a voltage source by means of a trailing cable 15. The photocell arrangement 16 is disposed directly beneath the light conductors 4.

In the illustrated example, the discs 2 are provided with stickers 1 which are coded in light-dark zones by the BCD code. This permits the coding of sixty-two discs. Two further characteristics are then still available for switching operations.

In preparation for use of the apparatus, each disc is provided with its sticker 1. Each sticker is associated with a particular key 8 identified by the title of the recording. The discs can be haphazardly positioned in the various compartments without following any particular rule. To play a disc, the user depresses the associated key 8. The stepping motor 11 is energized by way of the trailing cable 15. The motor displaces the carriage 9 in steps equal to the pitch of the compartments 3, the carriage moving beneath these compartments. This also causes the photocell arrangement 16 to move past the individual light conductors 4. The circuitry 13 contains logic elements such as AND gates. In a particular position, the circuitry 13 will detect identity between the characteristic information fed in by the key 8 and that detected by the photocell arrangement 16. The stepping motor 11 with then stop. The dispensing lever 5 will now be accurately located below the disc 2 that was nominated by depressing the key. The rotary magnet 12 is now also energised. It lifts the dispensing lever 5 which, in turn, lifts or dispenses the selected disc 2. The selected disc may be finally removed by hand or automatically placed on a turntable so as to be played. After a disc has been removed from its compartment, all the functions of the apparatus return to their starting position.

The advancing motion of the stepping motor 11, that is to say the pitch of the rack 14, is synchronized to the width or pitch of the compartments 3.

What is claimed is:

1. A phonograph disc storage mechanism comprising:

storage means for a plurality of phonograph discs;

manually operable means for indicating a desired one of said discs;

a plurality of labels each having a machine readable optical code thereon, each label being in the form of a circular disc having a radius not greater than that of the title label of the phonograph disc and a centered hole, at least one label being affixed to each phonograph disc concentrically with a unique code being provided for each disc;

first signal generating means operatively connected to said manually operable means for generating a signal corresponding to the code of the desired one of said discs;

second signal generating means for reading, successively, the code on each disc and generating signals corresponding thereto, said second means including an optical code reader, means for moving said reader in a path successively past the rim of each disc, and a light conductor for each storage position, the inlet end of said conductor being closely adjacent said label and the outlet end closely adjacent the path of movement of said reader; and means for comparing the signal from said first signal generating means and the signals from said second signal generating means to determine the location of the desired disc.

2. The mechanism of claim 1 wherein said code reading means is mounted on a carriage movable in a path extending along said storage means, and drive means being provided for said carriage.

3. The mechanism of claim 2 wherein a record dispensing lever is mounted on said carriage, said means for comparing said signals controlling said drive means to position said dispensing lever at the location of the desired disc.

4. The mechanism of claim 3 wherein said drive means is a stepping motor.

5. The mechanism of claim 3 wherein said dispensing lever is actuated by a rotary electromagnet.

6. A method for storing and retrieving phonograph discs in a mechanism of the type having storage means for a plurality of discs and manually operable disc selecting means, comprising the steps of:

labeling each disc in the region thereof bearing the title label with a machine readable optical code, a unique code being provided for each disc;

placing said discs in said storage means; and upon actuation of said selecting means, reading the codes on successive ones of said discs at locations adjacent the rims of said discs by means of optical conductors and a code reading mechanism to locate the one of said discs corresponding to the desired selection.

* * * * *